United States Patent [19]
Thomas

[11] 3,767,434
[45] Oct. 23, 1973

[54] METHOD OF PREPARING $P_2O_5$ — $SiO_2$ PRODUCTS

[75] Inventor: Ian M. Thomas, Temperance, Mich.

[73] Assignee: Owens-Illinois Inc., Toledo, Ohio

[22] Filed: Apr. 8, 1971

[21] Appl. No.: 132,583

[52] U.S. Cl.................. 106/52, 106/73.5, 252/317
[51] Int. Cl............................ C03c 3/04, C03c 3/06
[58] Field of Search...................... 106/52, 39 R, 69, 106/47; 117/93.4; 260/37 SB, 448.8, 429, 607; 65/134, DIG. 14; 23/182; 423/305, 304, 299, 326, 338; 252/317; 204/192

[56] References Cited
UNITED STATES PATENTS

| | | | |
|---|---|---|---|
| 2,738,336 | 3/1956 | Mavity | 260/448.8 A |
| 2,799,693 | 7/1957 | Dodgson | 260/448.8 A |
| 2,571,039 | 10/1951 | Hyde | 260/37 SB |
| 3,597,252 | 8/1971 | Schroder et al. | 106/52 |
| 3,432,312 | 3/1969 | Feagin et al. | 106/69 |
| 2,389,806 | 11/1945 | McGreagor et al. | 260/448.8 A |
| 2,550,923 | 5/1951 | Hackford et al. | 260/448.8 A |
| 3,640,093 | 2/1972 | Levene et al. | 65/134 |
| 3,414,463 | 12/1968 | Jasinski | 260/46.5 |
| 3,554,698 | 1/1971 | Burzynski et al. | 23/182 |
| 3,652,425 | 3/1972 | Wilson | 106/52 UX |
| 2,945,768 | 7/1960 | Grim | 106/52 |

FOREIGN PATENTS OR APPLICATIONS

| | | |
|---|---|---|
| 1,941,191 | 1/1971 | Germany |
| 1,286,038 | 1/1969 | Germany |

OTHER PUBLICATIONS

Schroeder, H. "Oxide Layers Deposited From Organic Solutions" Physics of Thin Films Vol. 5 Academic Press (1969) pg. 87, 94–99.

Roy, R.; Aids in Hydrothermal Experimentation No. 1, in Journ. Amer. Cer. Soc., 39 [4] p. 145–146 (1956) [TP785A62].

Tien, T. Y.; et al., The System $BiO_2$–$P_2O_5$ in Journ. Amer. Cer. Soc., 45 [4] 1962 pp. 422–424 [TP785A62].

Dislich –Glastechnischen Berichte, 44 Jahrgang, Jan. 1971 Heft 1, pp. 1–8 "Preparation of Multicomponent Glasses Without Fluid Melts"

Gefter, "Organophosphorus Monomers & Polymers," (1962), pp. 240–241.

*Primary Examiner*—Helen M. McCarthy
*Attorney*—E. J. Holler and Robert F. Rywalski

[57] ABSTRACT

A method is provided for producing high purity oxide products of phosphorus and silicon such as, for example, a $P_2O_5$ and $SiO_2$ glass wherein a silicon alkoxide is directly reacted with phosphorous acid, phosphoric acid, phosphorus pentoxide, or mixtures thereof, in the absence of any addition of a separate hydrolysis catalyst to produce a single phase solution reaction product and this reaction product with water is converted to a two-phase system, which two-phase system is removed of its free liquid components and the residue is then thermally decomposed to produce a product of phosphorus and silicon. This oxide product may be converted to a substantially unitary shape by conventional melting techniques or by conventional sintering techniques. The product may be used as an additive in conventional glass melting operations to supply at least a portion, and preferably all, of the $P_2O_5$ and/or silica requirements of the batch or the product may be compacted and suitably fired into a substantially unitary body, which body is an excellent target in sputtering applications for forming films on semiconductive materials such as, for example, silicon chips.

9 Claims, No Drawings

METHOD OF PREPARING P$_2$O$_5$-SIO$_2$ PRODUCTS

THE INVENTION

The present invention relates to a process for forming oxide products of phosphorus and silicon and more particularly, the present invention relates to the formation of phosphorus pentoxide-silica containing glass compositions from gelled polymers having phosphorus-oxygen-silicon linkages.

In my copending application, U.S. Ser. No. 132,581, there is described a process for forming homogeneous high purity oxide products of phosphorus and silicon, this application being hereby incorporated by reference. In that application, there is disclosed a method for forming oxide products of phosphorus and silicon having phosphorus-oxygen-silicon linkages, wherein a silicon alkoxide is first, at least partially hydrolyzed with water in the presence of an effective catalytic amount of hydrolysis catalyst to produce a single phase solution of an at least partially hydrolyzed silicon alkoxide, which material is then reacted with phosphoric acid, phosphorous acid, phosphorus pentoxide or mixtures thereof to form a clear solution of a soluble, substantially linear, further polymerizable polymer having phosphorus-oxygen-silicon linkages and then this soluble, substantially linear polymer is converted to a cross-linked polymer in the presence of a sufficient quantity of water to form a gel of said solution, then the gel is decomposed and an oxide product of phosphorus and silicon isolated and recovered therefrom. When formed into a substantially unitary article, this product represents an excellent sputtering target for use in conventional sputtering applications to form high quality, uniform film on, for example, platinum and silicon substrates. The present application represents an improvement in that process wherein the initial step of at least partially hydrolyzing the silicon alkoxide in the presence of an effective catalytic amount of a hydrolysis catalyst may be omitted.

Thus, it has been surprisingly found that there is no need to employ this extra step nor to add one of the conventional hydrolysis catalysts for example acids; the phosphoric acid, phosphorous acid, or phosphorus pentoxide can now be directly reacted with the silicon alkoxide and in a manner similar to that disclosed in the above-mentioned application, an oxide product of phosphorus and silicon recovered. Thus, by adjusting the amounts of equivalent P$_2$O$_5$ added, either in the form of phosphorus pentoxide or the equivalent thereof in the form of phosphorous acid or phosphoric acid relative to the equivalent amount of silica added in the form of silicon alkoxide, excellent substantially unitary, solid bodies or sputterable targets can be produced consisting essentially of about 8 to 26 weight percent P$_2$O$_5$, preferably about 15 to 19 weight percent P$_2$O$_5$ and about 74 to 92 weight percent SiO$_2$, preferably about 85 to 81 weight percent SiO$_2$ and wherein the alkali metal oxide impurities are less than about 300 parts by weight per million.

These substantially unitary solid bodies or targets may be used in any of the conventional sputtering techniques for forming high quality films on various substrates. As used herein, sputtering comprehends any process whereby particles, whether molecular and/or atomic size, are disintegrated, dislodged, evaporated or otherwise removed from a so-called target material and transferred to a selected substrate surface. The removal of the target material is by means of any appropriate energy, such as electron beam, laser beam, plasma discharge or the like. In a preferred type of sputtering process, the target material is disintegrated and transferred to a selected substrate surface such as, for example, a semiconductive surface by means of an RF sputtering process, that is, a process involving the atomic disintegration of a solid target appropriately struck by ions or atoms in a gaseous plasma discharge. The oxide products of phosphorus and silicon, as produced by the method described herein, are also useful as batch ingredients in conventional batch-forming techniques. This will be found to be particularly advantageous inasmuch as the bonding of the phosphorus-oxygen-silicon linkages in this material show excellent thermal stability and thus volatilization problems and toxicity problems, which are common using conventional materials for supplying P$_2$O$_5$ to a silicate glass, will be substantially minimized, if not entirely reduced.

Thus, according to one aspect of this invention, there is provided a method for producing an oxide product of phosphorus and silicon, which comprises: forming or providing a single phase solution intimately contacting phosphoric acid, phosphorus pentoxide, or mixture thereof with a compound represented by Formula I or II below:

I.

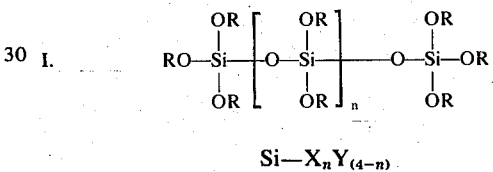

$$Si-X_nY_{(4-n)}$$

(II)

wherein in Formula I, R is C$_1$ to C$_6$ alkyl, such as, for example, methyl, ethyl, propyl, butyl, pentyl, hexyl and isomeric forms thereof and n is an integer between 0 to 10, and wherein in Formula II, n is 0 or 1, X is phenyl or a C$_1$ to C$_6$ alkyl, such as, for example, methyl or ethyl, and Y is an OR, wherein R is a C$_1$ to C$_6$ alkyl, such as, for example, ethyl; adding a sufficient quantity of water to said solution to form a two-phase system; and then removing free liquid components from said two-phase system and thermally decomposing the residue to obtain the oxide product of phosphorus and silicon.

According to another aspect of this invention, a homogeneous oxide product of phosphorus and silicon is obtained by a method which comprises: intimately contacting phosphorus pentoxide, phosphoric acid, phosphorous acid, or mixtures thereof, with (a) a compound represented by Formula II above, wherein n is 1 or (b) a compound of Formula II set forth above, wherein n is 0, in the presence of an effective solution forming amount of an organic solvent; or (c) a compound of the formula represented by I above in the presence of an effective solution forming amount of an organic solvent so as to form a clear solution; converting the solution product produced by the intimate contact above into a homogeneous gel in the presence of an effective gelling amount of water and recovering a homogeneous oxide product from the gel by thermally decomposing it.

When a compound of Formula II is employed, wherein n is 1, such as, for example, methyl triethoxysilane, it may be desired to also employ an effective solution forming amount of an organic solvent during the intimate contact step although this is not necessary and adds additional liquids which must be subsequently removed.

According to yet another aspect of this invention, a homogeneous oxide product of phosphorus and silicon is prepared by a method which comprises preparing a single phase solution consisting essentially of ethyl orthosilicate in ethanol, wherein the volume ratio of ethyl orthosilicate to ethanol is in the range of about 1/2:1 to about 1:1, intimately contacting said solution with orthophosphoric acid, wherein the amount of acid based on its equivalent $P_2O_5$ content, is at least about 1 part by weight per about 99 parts by weight of the equivalent $SiO_2$ content of the ethyl orthosilicate, forming a homogeneous gel from the reaction product of the preceding step in the presence of an effective gelling amount of water, then removing free liquid components from the homogeneous gel and recovering the oxide product. According to a highly preferred aspect of this invention, the effective gelling amount of water employed to form the homogeneous gel will be at least about 4 moles of water per mole of ethyl orthosilicate employed.

According to another feature of this invention, the oxide products of phosphorus and silicon as produced as described above are converted to a substantially unitary article such as, for example, by compaction and, more commonly, compaction followed by sintering, or even melting, and then this unitary article is used in a sputtering application as the target to form high quality sputtered films on semiconductive substrates.

While applicant does not wish to be bound by any theoretical considerations, especially in light of the complex reaction kinetics involved in the present application, it is believed that the initial reaction which forms a soluble phosphoro-silicon compound is between the added phosphorus compound, e.g., phosphorus pentoxide, phosphorous acid or phosphoric acid, and an alkoxide group of the silicon alkoxide. This reaction product, with the self-catalyzing effect of the phosphorus compound, in the presence of water then undergoes at least partial hydrolysis, as evidenced by the clear solution, and then a condensation reaction ultimately resulting in a cross-linked, homogeneous, three-dimensional network observable as a gel. Prior to the formation of the gel and even in the presence of an effective gelling amount of water, there will be formed a clear solution which is apparently a solution of a phosphoro siloxane material or, perhaps, more appropriately, a phosphor organo-siloxane material inasmuch as there will still be alkoxy linkages thereon. As the reaction proceeds, however, the cross-linking reactions begin to dominate and ultimately are observable as a gel.

The term "phosphoric acid" contemplates the various species thereof, including aqueous phosphoric acid, anhydrous phosphoric acid, such as may be produced by saturating or even super-saturating aqueous phosphoric acid with phosphorus pentoxide, anhydroacids of ortho-phosphoric acid, and the polyphosphoric acids. Thus, such compounds as $H_3PO_4$, $H_4P_2O_7$, $HPO_3$, $H_4P_2O_6$, and $H_6P_4O_{13}$ are included. Of these, orthophosphoric acid is preferred. Similarly, phosphorus acid contemplates the various species thereof, including $H_3PO_3$, $H_3PO_2$, and $H_4P_2O_5$. Phosphorus pentoxide refers, of course, to the compound $P_2O_5$, which to some is, perhaps, more appropriately termed "phosphoric anhydride." The amount of phosphoric acid or phosphorous acid or phosphorus pentoxide added will be routinely selected by those skilled in the art, but most advantageously, the amount will be at least about 0.3, but more preferably, at least about 1 or 2 parts by weight of equivalent $P_2O_5$ content thereof per about 99 parts by weight of equivalent silica in the starting alkoxide. When it is desired to form the advantageous sputterable compositions hereinbefore indicated, the amount of $P_2O_5$ and $SiO_2$ will be appropriately selected to produce a product within the ranges indicated. In the usual procedure, however, the amount of equivalent $P_2O_5$ added will generally have a molar ratio of less than about 1 mole of $P_2O_5$ per about 1 mole of equivalent silica present in the silicon alkoxide employed.

As hereinbefore indicated, a single phase solution is first provided which is a reaction product produced by intimately contacting phosphoric acid, phosphorous acid, phosphorus pentoxide, or mixtures thereof with a silicon alkoxide, such as those represented by Formula I and Formula II above, and this solution of the reaction product is then, in the presence of a sufficient quantity of water, converted to a two-phase system; free liquid components are then removed from the system and the residue therein is thermally decomposed to the desired product. When the silicon alkoxides which are employed are those represented by Formula I or those represented by Formula II, wherein n in Formula II is 0, and no organic solvent is present when the intimate contact with the phosphoric acid, phosphorous acid or phosphorus pentoxide is made, the two-phase system which subsequently forms in the presence of a sufficient quantity of water to theoretically hydrolyze all the alkoxy groups in the initial silicon alkoxide, will be a heterogeneous two-phase system having a gelatinous precipitate. The two-phase system may then be converted to an oxide product of phosphorus and silicon by conventional procedures such as, for example, heating to evaporate free liquid components and then thermally decomposing the residue to produce the oxide product of phosphorus and silicon. According to a highly preferred embodiment, however, instead of forming a heterogeneous two-phase system of the type described immediately above, there is formed a homogeneous two-phase system which is a uniform gel product. The heterogeneous system as noted above, i.e., a system with a precipitate in a liquid, of course, does not have homogeneous features of the preferred uniform gel of the cross-linked polymer. Thus, according to this highly preferred embodiment, when compounds represented by Formula I are employed, or by Formula II, wherein $n$ is 0 in Formula II, the contacting and reacting with phosphoric acid, phosphorous acid, or phosphorus pentoxide, will be done in the presence of a sufficient amount of an organic solvent such that the reaction product which forms will be in the form of a single phase solution. In passing, it should be mentioned that when silicon alkoxides of the type represented by Formula II, wherein $n$ is 1, are employed, the homogeneous gel will be obtained without the use of an organic solvent; however, even when using these types of silicon alkoxides, those skilled in the art may desire, for processing convenience, to likewise employ an organic solvent. Suitable amounts of solvent will be routinely selected by those skilled in the art. Advantageously, however, the volume ratio of solvent employed to the volume of silicon alkoxide employed will be in the range of about ⅛:1 to about 8:1 with a preferred range being about ¼:1 to about 4:1. An especially highly preferred range will be between about ½:1 to about 1:1. It is believed, when using compounds represented by Formula I or compounds represented by Formula II, wherein n is 0, that the presence of the solvent has a beneficial effect on providing a uniform controlled rate of reaction whereby, after the reaction of the phosphorus compound with the silicon alkoxide, a soluble, substantially linear, further polymerizable phosphorosiloxane or phosphoro-organosiloxane is first formed and that it likewise has a beneficial effect on the subsequent reaction wherein this material is converted, at a more uniform and beneficial rate, to the cross-linked three-dimensional gel structure in the presence of sufficient water.

Suitable solvents may, for example, be mono, di, and tri-hydric alcohols, like alkylene glycols, for example ethylene or hexylene glycol and the like, glycerine, including the monoalkyl ethers of di-hydric alcohols, cyclic ethers, like dioxane and tetrahydrofuran and other water soluble organic solvents. The $C_1$ to $C_3$ alkyl alcohols, like methanol, ethanol, normal propanol, isopropanol, are especially highly preferred. Usually the solvents will be volatile, i.e., they will have boiling points of about 300° C. or less and preferably 150° C. or less.

After forming the single phase solution of the reaction product between the silicon alkoxide and the phosphorus pentoxide, phosphorus acid or phosphoric acid, as described above, the system then, in the presence of an effective gelling amount or an effective two-phase forming amount of water, is converted to either the highly preferred homogeneous gel or to the less preferred two-phase heterogeneous system containing a gelatinous precipitate in a liquid medium. In the usual instance, the effective amount of water which need be present will generally be at least about 1 mole of water per 2 OR groups per mole of silicon alkoxide initially employed. With compounds of Formula I, for example, when $n$ is 2, the amount of water will generally be at least about 5 moles per mole of Formula I compound. When compounds represented by Formula II are employed, wherein n is 0, the amount of water will generally be at least about 2 moles per mole of tetraalkoxy functional material. Similarly, when using compounds of Formula II, wherein n is 1, the amount of water will generally be at least about 1.5 moles per mole of the silane employed. In order to obtain more desirable reaction rates, it will be advantageous, however, to employ an excess of this amount of water, for example, 2, to 3 or 4, or more, times the amount indicated above. Thus, for example, the process will be quite advantageously practiced by employing between about 2 to about 6 times the quantity of water indicated above.

After forming the two-phase system, the free liquid components are removed therefrom and the residual material thermally decomposed to produce the oxide product of phosphorus and silicon. In the case of the heterogeneous, gelatinous precipitate, this will most conveniently be done by a gentle drying step to remove free liquid components, such as, for example, by heating at about 50° C. to 125°C. under vacuum, and then heating the dried product to a temperature and for a time sufficient to obtain the oxide product of phosphorus and silicon. In passing, it should be noted that not only in the case when the heterogeneous, gelatinous precipitate is formed, but also in the case of forming the highly preferred, homogeneous gel, the heating will usually result in a black granular product being obtained, such as, for example, when it is heated for two or three hours, at about 400° C. to 600° C. Further heating, either at that temperature for longer times or at higher temperatures, say, temperatures on the order of 1,000° C., for about 18 hours will, however, convert this product into a white material. The recovery or isolation of the desired homogeneous oxide product of phosphorus and silicon from the highly preferred homogeneous gel will generally be accomplished in a similar manner by a thermal degradation step. This may include appropriately heating the gel at a temperature and for a time sufficient to evaporate and degrade organic components therein to thereby produce the desired inorganic material or the gel may also be thermally degraded by heating in a pressure vessel at a temperature above the critical temperature of the liquid components of the gel so as to vaporize and remove such liquid components and convert the gel to an aerogel product having a high surface area. A typical procedure is simply to evaporate the free liquid components from the homogeneous gel by heating it about 50° C. to about 125° C. under vacuum and then calcining the material, for example, by heating to temperatures of about 300° C. to 800 or 900° C. for a time sufficient to obtain the desired product. Most typically, however, heating to about 400° C. to about 600° C. will be quite sufficient.

Of course, if desired, other constituents may be added into the system most advantageously at the point immediately prior to the formation of the two-phase system. This may be done in a manner more fully disclosed in copending application, U.S. Ser. No. 843,777 U.S. Pat. No. 3,640,093, which is assigned to the same assignee as the present application.

The oxide product of phosphorus and silicon described above will then advantageously be converted to a substantially unitary article or body. This may be done, for example, by simply melting the composition by conventional glass melting techniques. According to highly preferred practice, however, the oxide products will be converted into substantially unitary articles by conventional sintering techniques and the sintered article then employed as a sputtering target to produce films on semiconductive materials. Thus, for example, the material may be first pressed into an appropriate shape and then sintered, or even partially melted, to produce the solid body or target. When it is desired to form a sputterable target having the compositions indicated hereinbefore, the alkali metal oxide impurities are easily maintained below about 300 parts by weight per million and thereby provide an ultra-pure target material which produces quite outstanding results in conventional sputtering applications. By more closely selecting the purity of the starting materials, that is, the silicon alkoxide, water, and solvent, if employed, or the appropriate phosphorus compound, impurities may be decreased still further, such as, for example, to levels on the order of 100 or 50 parts per million or even less.

In order to allow those skilled in the art to more fully understand the invention, the following examples are given, not by way of limitation, but rather by way of illustration. In these examples, the preferred practice of the invention is set forth wherein phosphoric acid and a silicon alkoxide are initially reacted and this reaction product is then, in the presence of sufficient water, converted to a soluble, substantially linear, further polymerizable, phosphoro-siloxane or, perhaps, more accurately, phosphoro-organo-siloxane, which siloxane is then further polymerized by cross-linking in the presence of sufficient water to create a homogeneous gel material which is subsequently converted to the desired oxide product.

EXAMPLE 1

Into a beaker there were added 1,440 grams (6.92 moles) of ethyl orthosilicate and to this there was then added 700 ml of 96 percent ethanol, thereby producing a single phase solution. To this solution there was added with agitation about 147 grams of an 85.3 weight percent aqueous solution of ortho phosphoric acid. A reaction ensued and there remained a clear solution of the soluble reaction product. To this solution there was then slowly added with stirring about 472 ml of distilled water with heat being liberated and the temperature rising to approximately 65° to 70° C. At this point there was a clear, somewhat viscous solution of the soluble, further polymerizable, substantially linear, phosphor organosiloxane. This solution, after allowing it to stand for a period of approximately 15 minutes, cross-linked and formed a homogeneous gel. The gel was then dried for about sixteen hours at 60° C. in an oxygen ventilated oven, then the temperature was raised to about 110° C. and held there for four hours. After this, the material was heated and held at a temperature of about 200° C. for about four hours and then was allowed to set overnight, that is, a period of about sixteen hours, at a temperature of 300° C. after which time there was produced a jet black product which weighed 553 grams.

This black product is then further heated to a temperature of about 1830° F. (about 1000° C.) for about 18 hours, whereby it converts to a white, particulate mass having a $P_2O_5$ content of about 16.4 weight percent. This white mass is then passed through a 100 mesh screen (U. S. Sieve) and about 333 grams of the phosphoro siloxane powder as prepared above, are then mixed with about 10 grams of a conventional binder (polyethylene glycol, manufactured and sold under the trade name CARBOWAX 20 M) and approximately 100 cc of acetone. A portion of the acetone is allowed to evaporate until a slurry on the order of the consistency of tooth paste is formed and this slurry is then granulated by passage through an 8-mesh screen. The granulated material is allowed to sit overnight to further complete acetone evaporation and this material then pressed into a disk of about 5.1 inches in diameter with a hydraulic pressure of about 50 tons. This pressed green disk is then sintered by conventional heating techniques. In this instance, the disk first heated to about 500° F. and held there for about one-half hour and then gradually heated to about 1830° F. and held there for about one hour and then it is finally heated to approximately 2280° F. over a period of time of about two hours and held at that temperature for about 15 minutes. The disk is then gradually allowed to cool at room temperature.

This disk is then used as a target material to sputter coatings onto silicon chips and platinum substrates using conventional RF sputtering techniques. In this specific instance a low energy unit such as that supplied by Consolidated Vacuum Corporation as their type AST-100 unit employing their AST-200, RF amplifier, is used. Excellent high quality films will be produced on silicon chips and platinum substrates using equipment of the type indicated above at an Argon pressure of about 5 microns with 700 watts of power at a frequency of 13.56 mHz.

EXAMPLE 2

The procedure of Example 1 is followed except there is employed anhydrous ethanol and approximately 500 ml of distilled water is added subsequent to the addition of the phosphoric acid. The homogeneous gel which is produced is then thermally degraded and material made in this manner is converted to a substantially unitary body as described above. This body when sputtered under the conditions indicated above produces substantially identical results.

EXAMPLE 3

Into a beaker there is then added about 172 grams of methyl triethoxysilane. To this there is then slowly added with agitation about 24.3 grams of an 85.3 weight percent ortho phosphoric acid solution. A reaction ensued as evidenced by the liberation of heat and after several minutes, a viscous, clear solution of the phosphoro-silicon reaction product was produced. To this clear, viscous solution with stirring, there was slowly added approximately 75 ml of distilled water. After the addition of the water there was a clear solution of a soluble, substantially linear, further polymerizable phosphoro-organosiloxane material. After allowing the solution to stand for approximately three to five minutes, the material cross-linked and produced a homogeneous uniform gel. Gels produced in this manner, when treated in the manner recited in Example 1, produce substantially identical results when they are subjected to sputtering applications as therein set forth.

While the above describes the present invention and enables one skilled in the art to make and use same, it will, of course, be apparent that modifications are possible which, pursuant to the patent laws and statutes, are comprehended within the scope of the present invention.

I claim:

1. The method of producing a homogeneous oxide product consisting of phosphorus and silicon oxides which consists of:
   a. directly reacting phosphorus pentoxide, phosphoric acid, phosphorous acid or mixtures thereof with (1) a compound of the formula $SiX_nY_{(4-n)}$, wherein $n$ is 1, X is phenyl or an alkyl having one to six carbon atoms, and Y is OR wherein R is a $C_1$—$C_6$ alkyl or (2) a compound as set forth in (1) wherein $n$ is 1 in the presence of an effective solution forming amount of an organic solvent, or (3) a compound of the formula set forth in (1) wherein $n$ is 0 in the presence of an effective solution forming amount of an organic solvent, or (4) a compound of the formula

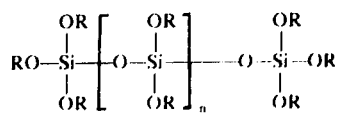

wherein $n$ is 0 to 10 and R is an alkyl of one to six carbon atoms in the presence of an effective solution forming amount of an organic solvent, so as to form a clear, single phase solution of further hydrolyzable material, the amount of $P_2O_5$, or its equivalent, being between about 0.3 parts by weight per about 99 parts by weight of equivalent silica to about 1 mole per mole of equivalent silica,
   b. adding an effective gelling amount of water to said clear solution so as to convert said clear solution to a homogeneous gel,
   c. removing free liquid components from said homogeneous gel and heating so as to remove residual organic material and form a white mass of said product.

2. The method of claim 1 and further including the step of converting said product of step (c) to a unitary article by sintering or by melting and cooling to form a glass.

3. The method set forth in claim 1 wherein said compound which is directly reacted is the compound set forth in (4) and wherein said solvent is a $C_1$—$C_3$ alcohol.

4. The method of claim 1 wherein said compound which is directly reacted is a compound of the formula $SiX_nY_{(4-n)}$ wherein n is 0 and wherein said solvent is a $C_1$—$C_3$ alcohol.

5. The process of claim 1 wherein said compound which is directly reacted is a compound of the formula $SiX_nY_{(4-n)}$ wherein $n$ is 1, X is phenyl or an alkyl having one to six carbon atoms, and Y is OR wherein R is a $C_1$—$C_6$ alkyl.

6. The method of claim 5 wherein said compound is phenyl triethoxy silane.

7. The method of claim 5 wherein said compound is methyl triethoxy silane.

8. The method of claim 4 wherein said compound is ethyl orthosilicate and wherein said solvent is a $C_1$ to $C_3$ alcohol.

9. The method of claim 8 wherein the volume ratio of said alcohol to said ethyl orthosilicate is in the range of about ¼:1 to about 4:1.

* * * * *

UNITED STATES PATENT OFFICE
CERTIFICATE OF CORRECTION

Patent No. 3,767,434  Dated October 23, 1973

Inventor(s) Ian M. Thomas

It is certified that error appears in the above-identified patent and that said Letters Patent are hereby corrected as shown below:

In the Title, "$P_2O_5=SiO_2$" should be --$P_2O_5-SiO_2$--; Column 2, line 24, "mixture" should be --mixtures--; Column 2, at about line 35, "(II)" should be --II.--. Column 2, at about line 30, the formula

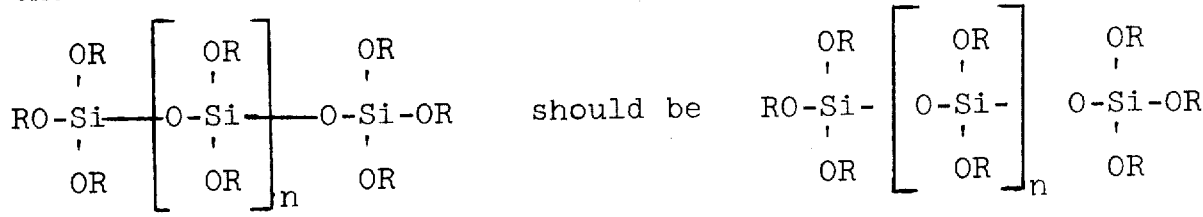

In Claim 1 the formula

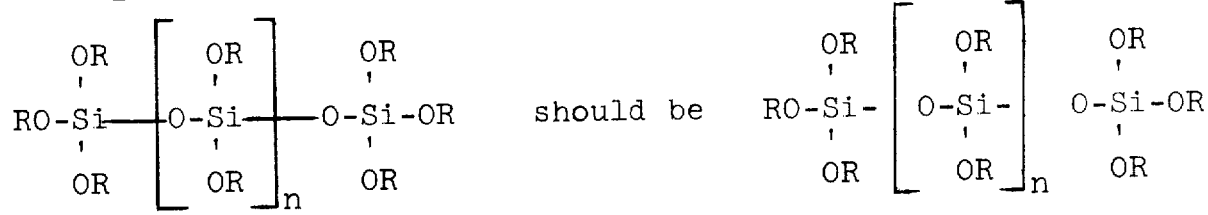

Signed and sealed this 16th day of July 1974.

(SEAL)
Attest:

McCOY M. GIBSON, JR.
Attesting Officer

C. MARSHALL DANN
Commissioner of Patents